(12) United States Patent
Lang et al.

(10) Patent No.: US 8,126,702 B2
(45) Date of Patent: Feb. 28, 2012

(54) TRANSLATING DATA OBJECTS

(75) Inventors: Robert Lang, Wiesloch (DE); Wolfram Siefke, Heidelberg (DE)

(73) Assignee: SAP AG, Walldorf (DE)

( * ) Notice: Subject to any disclaimer, the term of this patent is extended or adjusted under 35 U.S.C. 154(b) by 1129 days.

(21) Appl. No.: 11/195,449

(22) Filed: Aug. 1, 2005

(65) Prior Publication Data

US 2007/0027908 A1 Feb. 1, 2007

(51) Int. Cl.
*G06F 17/20* (2006.01)
*G06F 17/28* (2006.01)
(52) U.S. Cl. .................. 704/8; 704/2; 704/4; 704/7
(58) Field of Classification Search .............. 704/2–8; 707/103
See application file for complete search history.

(56) References Cited

U.S. PATENT DOCUMENTS

| | | | | |
|---|---|---|---|---|
| 5,243,519 A * | 9/1993 | Andrews et al. | | 704/8 |
| 5,497,319 A * | 3/1996 | Chong et al. | | 704/2 |
| 6,092,036 A * | 7/2000 | Hamann | | 704/8 |
| 6,182,062 B1 * | 1/2001 | Fujisawa et al. | | 707/3 |
| 6,219,632 B1 * | 4/2001 | Schumacher et al. | | 704/2 |
| RE37,722 E * | 5/2002 | Burnard et al. | | 713/1 |
| 7,020,601 B1 * | 3/2006 | Hummel et al. | | 704/2 |
| 7,171,352 B2 * | 1/2007 | Chang et al. | | 704/9 |
| 7,254,805 B2 * | 8/2007 | Tibazarwa | | 717/100 |
| 7,437,704 B2 * | 10/2008 | Dahne-Steuber et al. | | 717/100 |
| 7,571,092 B1 * | 8/2009 | Nieh | | 704/2 |
| 7,627,479 B2 * | 12/2009 | Travieso et al. | | 704/277 |
| 7,634,397 B2 * | 12/2009 | Suen et al. | | 704/8 |
| 7,680,646 B2 * | 3/2010 | Lux-Pogodalla et al. | | 704/2 |
| 7,711,544 B2 * | 5/2010 | McEntee et al. | | 704/4 |
| 7,797,151 B2 * | 9/2010 | Apte et al. | | 704/8 |
| 2002/0169594 A1 * | 11/2002 | Yasuda et al. | | 704/5 |
| 2002/0177993 A1 * | 11/2002 | Veditz et al. | | 704/8 |
| 2002/0188670 A1 * | 12/2002 | Stringham | | 709/203 |
| 2003/0009323 A1 * | 1/2003 | Adeli | | 704/8 |
| 2004/0111254 A1 * | 6/2004 | Gogel et al. | | 704/8 |

* cited by examiner

*Primary Examiner* — James S. Wozniak
*Assistant Examiner* — Jialong He
(74) *Attorney, Agent, or Firm* — Schwegman, Lundberg & Woessner, P.A.

(57) ABSTRACT

Translating information, such as an object type and content, in a first data object from an initial language into a target language includes searching a database to locate a second data object having the object type, attempting to obtain, from the second data object, the object type and the content in the target language, and storing, in the first data object, the object type and content in the target language.

20 Claims, 3 Drawing Sheets

---

102

Object name: ABC
Object ID: 123

| | EN | DE | FR |
|---|---|---|---|
| Type | Product | | |
| Attrib. 1 | Description | | |
| Value 1 | Monitor | | |
| Attrib. 2 | Color | | |
| Value 2 | Grey | | |
| Attrib. 3 | Video Mode | | |
| Value 3 | Colour | | |
| Attrib. 4 | Language | | |
| Value 4 | German | | |

104

Object name: DEF
Object ID: 345

| | EN | DE | FR |
|---|---|---|---|
| Type | Person | Person | |
| Attrib. 1 | Description | Beschreibung | |
| Value 1 | male | Männlich | |
| Attrib. 2 | | | |
| Value 2 | | | |
| Attrib. 3 | | | |
| Value 3 | | | |
| Attrib. 4 | | | |
| Value 4 | | | |

106

Object name: GHI
Object ID: 678

| | EN | DE | FR |
|---|---|---|---|
| Type | Product | Produkt | |
| Attrib. 1 | | | |
| Value 1 | | | |
| Attrib. 2 | | | |
| Value 2 | | | |
| Attrib. 3 | Video Mode | Video Modus | |
| Value 3 | Color | Farbe | |
| Attrib. 4 | Language | Sprache | Langue |
| Value 4 | German | Deutsch | allemand |

108

Object name: JKL
Object ID: 921

| | EN | DE | FR |
|---|---|---|---|
| Type | Product | | Produit |
| Attrib. 1 | Description | Beschreibung | Description |
| Value 1 | Monitor | Monitor | moniteur |
| Attrib. 2 | Color | | Couleur |
| Value 2 | Grey | | gris |
| Attrib. 3 | Video Mode | | Video mode |
| Value 3 | Colour | | couleur |
| Attrib. 4 | Weight | Gewicht | |
| Value 4 | 5 kg | 5 kg | |

102

Object name: ABC
Object ID: 123

| | EN | DE | FR |
|---|---|---|---|
| Type | Product | | |
| Attrib. 1 | Description | | |
| Value 1 | Monitor | | |
| Attrib. 2 | Color | | |
| Value 2 | Grey | | |
| Attrib. 3 | Video Mode | | |
| Value 3 | Colour | | |
| Attrib. 4 | Language | | |
| Value 4 | German | | |

104

Object name: DEF
Object ID: 345

| | EN | DE | FR |
|---|---|---|---|
| Type | Person | Person | |
| Attrib. 1 | Description | Beschreibung | |
| Value 1 | male | Männlich | |
| Attrib. 2 | | | |
| Value 2 | | | |
| Attrib. 3 | | | |
| Value 3 | | | |
| Attrib. 4 | | | |
| Value 4 | | | |

106

Object name: GHI
Object ID: 678

| | EN | DE | FR |
|---|---|---|---|
| Type | Product | Produkt | |
| Attrib. 1 | | | |
| Value 1 | | | |
| Attrib. 2 | | | |
| Value 2 | | | |
| Attrib. 3 | Video Mode | Video Modus | |
| Value 3 | Color | Farbe | |
| Attrib. 4 | Language | Sprache | Langue |
| Value 4 | German | Deutsch | allemand |

108

Object name: JKL
Object ID: 921

| | EN | DE | FR |
|---|---|---|---|
| Type | Product | | Produit |
| Attrib. 1 | Description | Beschreibung | Description |
| Value 1 | Monitor | Monitor | moniteur |
| Attrib. 2 | Color | | Couleur |
| Value 2 | Grey | | gris |
| Attrib. 3 | Video Mode | | Video mode |
| Value 3 | Colour | | couleur |
| Attrib. 4 | Weight | Gewicht | |
| Value 4 | 5 kg | 5 kg | |

FIG. 1

TRANSLATING DATA OBJECTS

TECHNICAL FIELD

This patent application relates generally to translating data objects, such as business objects, from one language into another language.

BACKGROUND

In object-oriented programming, a data object is a self-contained entity that includes both data and procedures to manipulate the data. A business object is a special type of data object that stores data relating to a business or aspect of a business.

Increasing globalization requires that data objects, such as business objects, be available in various languages, such as German, French and English. Manual translation of business objects can be a tedious and time-consuming task, however. Accordingly, automatic translation mechanisms have been developed to facilitate translation.

SUMMARY

This patent application describes methods and apparatus, including computer program products, for translating data objects, such as business objects, from one language into another language.

In general, in one aspect, the invention is directed to translating information in a first data object from an initial language into a target language. The information includes an object type and content. This aspect includes searching a database to locate a second data object having the object type, attempting to obtain, from the second data object, the object type and the content in the target language, and storing, in the first data object, the object type and content in the target language.

One of the advantages of the foregoing aspect of the invention is that it leverages translations of existing business objects to perform much of the translation automatically. This reduces the need for manual intervention during translation, thereby making it possible to translate large numbers of business objects relatively quickly.

The foregoing aspect may also include one or more of the following features. The content may include at least one attribute and at least one attribute value that corresponds to the attribute. The at least one attribute contains data that relates to a subject of the data object and the at least one attribute value contains data that specifies the attribute.

In one aspect, the invention may include obtaining, from the second data object, the object type and the content in a second target language, and storing, in the first data object, the object type and the content in the second target language. The second data object may include a language identifier that corresponds to the target language, and searching may include using the language identifier to locate the second data object.

In another aspect, the invention may include receiving data corresponding to the target language. Searching may include using data corresponding to the target language to locate the second data object. If at least one of the object type and the content in the target language cannot be obtained from the second data object, a request may be issued to an external source for at least one of the object type and the content in the target language.

In other aspects, the invention may include requesting confirmation of at least one of the object type and the content in the target language prior to storing, in the first data object, the object type and the content in the target language, and/or before searching, attempting to obtain, from the first data object, the object type and content in the target language. If the object type and the content in the target language is obtained from the first data object, the following may be skipped: searching the database to locate a second data object having the object type, and attempting to obtain, from the second data object, the object type and the content in the target language.

The details of one or more examples are set forth in the accompanying drawings and the description below. Further features, aspects, and advantages of the invention will become apparent from the description, the drawings, and the claims.

DESCRIPTION OF THE DRAWINGS

FIG. 1 includes diagrams showing representations of four business objects.

Like reference numerals in different figures indicate like elements.

DETAILED DESCRIPTION

Figure 2:
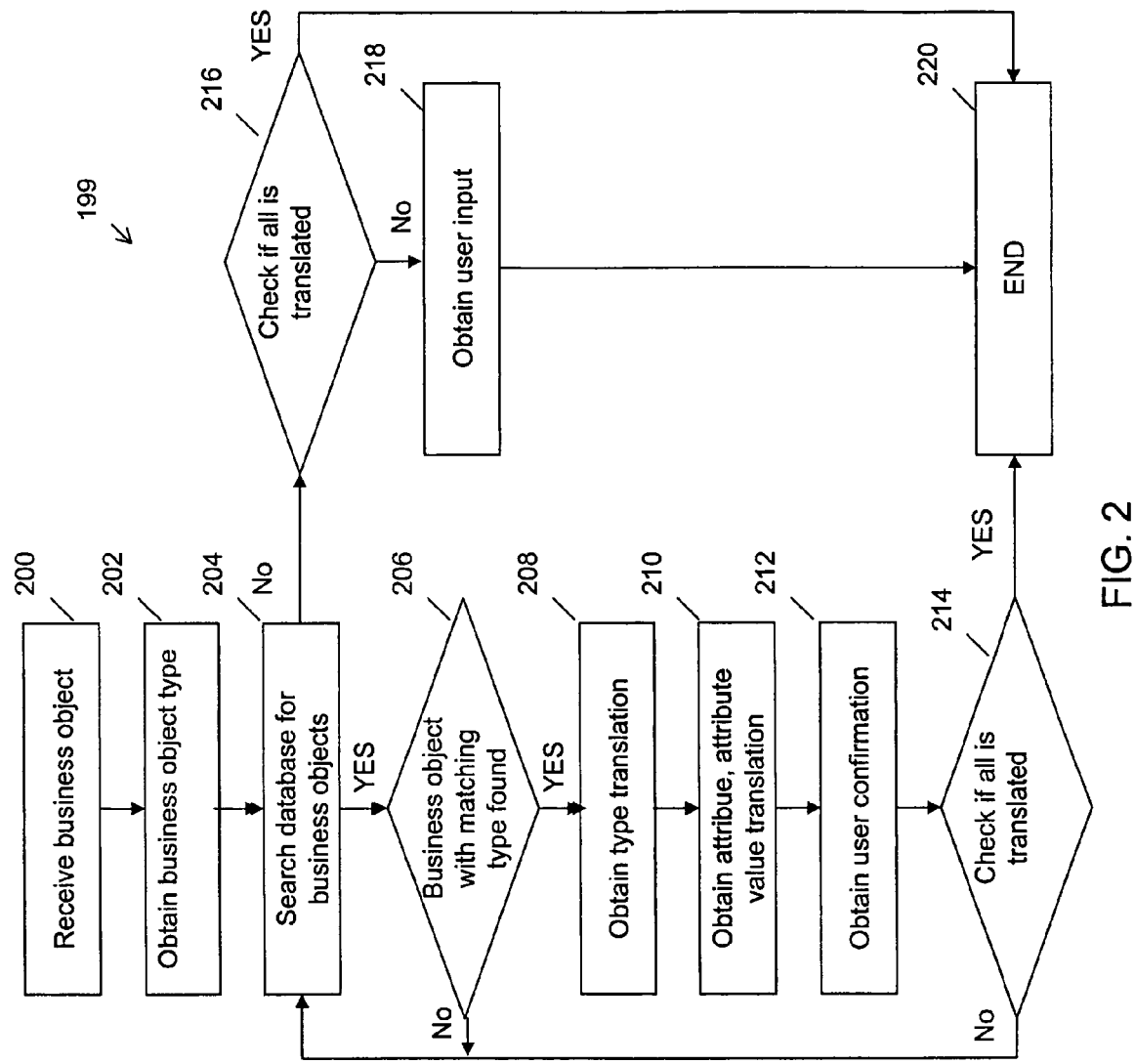
FIG. 2 is a flowchart showing a process for translating a business object from one language into another language.

Enterprise Resource Planning (ERP) software, such as SAP® R/3, mySAP.com, and SAP®Netweaver®, store data in business objects. The data may relate to various aspects of an organization, such as client data, factory structures, machine structures, production sequences, and materials (or other) lists. The structure of the business objects may be dictated by real-world conditions of an organization, such as required maintenance. The business objects may simulate real-world structures of an organization, and may include content, such as attributes and attribute values. The business objects may also facilitate computer-aided planning, maintenance, and operation via ERP software.

Described herein is a process, and variations thereof, for translating objects from one language (e.g., English) to another language (e.g., German). For example, the process may be used to translate elements of a business objects, such as its attributes or attribute values (described below). The process is described herein in the context of business objects; however, the process may be used to translate any type of data object.

FIG. 1 shows representations of business objects 102, 104, 106 and 108. These business objects may be stored in a memory area of a computer, e.g., in a database, and may contain both data and computer executable code/instructions. As shown in FIG. 1, each business object 102, 104, 106 and 108 contains distinguishing name(s) and identifier(s). In this example, each business object contains a language identifier: EN for English, DE for German, and FR for French. These language identifiers may comply with International Organization for Standardization (ISO) rule 639, which provides standardized identification of languages using two character identifiers. The language identifiers in the business objects are used in translation of the objects, as described below.

Business object 102 is an example of a business object that describes a video monitor. As shown in FIG. 1, business object 102 contains attributes and attribute values that describe the video monitor. The attributes correspond to a feature of the video monitor and attribute values correspond to a specific type of that feature. For example, business object 102 has an object type "product", a first attribute "description" having an attribute value "monitor", a second attribute "color" having an attribute value "grey", a third attribute "video mode" having an attribute value "color", and fourth attribute "language" having an attribute value "German". Thus, business object 102 describes a video monitor that is grey in color, that has a color display, and that provides audio/video in German. Business object 102 may also include other attributes and attribute values not shown in FIG. 1. Likewise, different attributes may be substituted for those shown in FIG. 1. Business objects having different structures may also be used.

FIG. 1 also shows other business objects, as follows. Business object 104 describes a person. Business object 104 thus has an object type "person", and has an attribute (its sole attribute) "description" having a corresponding attribute value "male". Business object 106 describes a product. Business object 106 thus has an object type "product". Business object 106 has an attribute "video mode" having an attribute value "color", and an attribute "language" having an attribute value "German". Business object 108 also describes a product. Business object 108 has an object type "product", and also includes various attributes and corresponding attribute values.

FIG. 2 shows a process 199 for use in translating business objects from one language to one or more other languages. Process 199 is described below with respect to business objects 102, 104, 106 and 108.

Referring to FIG. 2, process 199 receives (200) business object 102. Process 199 examines business object 102 and extracts data therefrom. In particular, process 199 obtains (202) the object type from business object 102. In this example, business object 102 has an object type "product.

Process 199 searches (204) one or more databases for business objects. The database(s) can be stored in several computers or in only one computer. Business object(s) that are located via this searching (204) are processed to determine (206) whether those business object(s) have object types that match the object type of business object 102. For example, during the search (204), business object 104 may be located. Process 199 examines (206) business object 104 to determine if business object 104 has an object type that matches the object type of business object 102. In this case, business object 104 has the object type "person". This object type does not match the object type of business object 102. Thus, business object 104 is not used to translate business object 102, and process 199 continues its search (204).

In particular, process 199 continues to search (204) database(s) for business objects having an object type that matches the object type of business object 102. Process 199 may locate business object 106. Process 199 examines (206) business object 106 to determine if its object type matches that of business object 102. In this case, business object 106 has the object type "product", which matches the object type of business object 102.

Because business object 106 has the same object type as business object 102, process 199 determines whether business object 106 includes a translation for the object type "product". This may be done by examining the language identifier associated with business object 106. That is, if process 199 knows that the desired translation is from, e.g., English to German, and process 199 determines that business object 106 is in German based on its language identifier, process 199 obtains (208) the appropriate German-language text from business object 106. For example, process 199 obtains a German translation of object type "product", namely "Produkt". Process 199 stores the translation of the object type—in this case, the German text—in business object 102.

Process 199 also examines business object 106 to determine whether any attributes or attribute values of business object 106 match the attributes or attribute values of business object 102. For those that match, process 199 may also obtain, from business object 106, translations of such attributes or attribute values. For example, process 199 obtains (210), from business object 106, a German translation of the attribute "video mode" and attribute value "color", and for the attribute "language" and attribute value "German".

Business object 106 also provides translations, into French, of the attribute "language" and attribute value "Germnan". Process 199 may also obtain, from business object 106, French-language translations of attributes and their values in business object 102. Process 199 may store these translations in business object 102, as above.

Process 199 may be configured to obtain (212) user confirmation of the translations before storing the translations in business object 102. For example, process 199 may present obtained translations to a user, and may ask the user to confirm that the translation(s) should be stored in business object 102. Assuming that the user confirms that the translations are accurate (or should be stored), process 199 stores the translations in business object 102, as described above. If the user does not confirm that the translations are accurate or should be stored in business object 102, process 199 may disregard the translations and not store them in business object 102.

After all attribute names and attribute values of business object 106 have been checked for use in translating business object 102, process 199 determines (214), whether the business object type, all attribute names, and all attribute values of business object 102 have been translated into target language (s). As described below, a target language is a language into which the business object is to be translated. If all of business object 102 has not been translated, process 199 continues searching (204) for business objects containing translations of elements of business object 102 that have not already been translated.

Process 199 may locate business object 108 during its search (204). Process 199 examines business object 108 and determines that the object type of business object 108 matches (206) the object type of business object 102. Business object 108 provides a French translation of the object type "product", which process 199 obtains (208) for storage in business object 102. Business object 108 also provides translations into German and French for the attribute "description" and its attribute value "monitor", and into French only for the attribute "color" its attribute value "grey". Business object 108 provides a translation of the attribute "video mode" and its attribute value "color" into French. Process 199 obtains (210) the appropriate attribute and attribute value translations for storage in business object 102. The attribute "Weight" and attribute value "5kg" of business object 108 are not used in the translation of business object 102 because business object 102 has no corresponding attributes and attribute values.

As noted above, process 199 may request confirmation (212) of any translations by the user. Following confirmation, if necessary, process 199 may determine (214) if all of business object 102, including its type, attributes, and attribute values, has been translated. In this example, the attribute "color" and the attribute value "grey" of business object 102 have not been translated into German. This is because neither business object 106 nor business object 108 provided corresponding translations.

Process 199 may therefore continue to search (204) for additional business objects having the same object type as business object 102. However, in this case, no other business objects are located as a result of this searching. Accordingly, process 199 proceeds to check (216) if all of business object 102 has been translated. Because the attribute name "color" and the attribute value "grey" of business object 102 have not been translated into German, process 199 cannot confirm the check (216). Accordingly, process 199 requests and receives (218) a user input for a German translation of the attribute name "color" and the attribute value "grey", whereafter process 199 ends (220). Alternatively, the user may decline to input the translations, in which case process 199 also ends (220). In some implementations, process 199 may be configured to obtain the required translations from business objects having different object types in the same manner described above.

Process 199 may be configured to provide an indication of the language into which the business object is translated. This is the target language. In this case, in 214, 216 process 199 determines only if the appropriate translations for the target language have been obtained and stored in the business object 102 (as opposed to checking to determine whether all translations, e.g., both French and German, have been obtained). Further, if a target language has been provided, in 208, 210 process 199 may be configured to obtain translations only in the appropriate target language, and to ignore any other available translations in the business objects located during searching (204).

When obtaining (208, 210) the appropriate translations, process 199 may be configured to examine business object 102 to determine whether such translations are available directly from business object 102. If a translation is available from business object 102, process 199 will obtain the translation from business object 102 and skip the remainder of the process for that translation. Otherwise, process 199 will obtain the translation from another business object, as described above.

Figure 3:
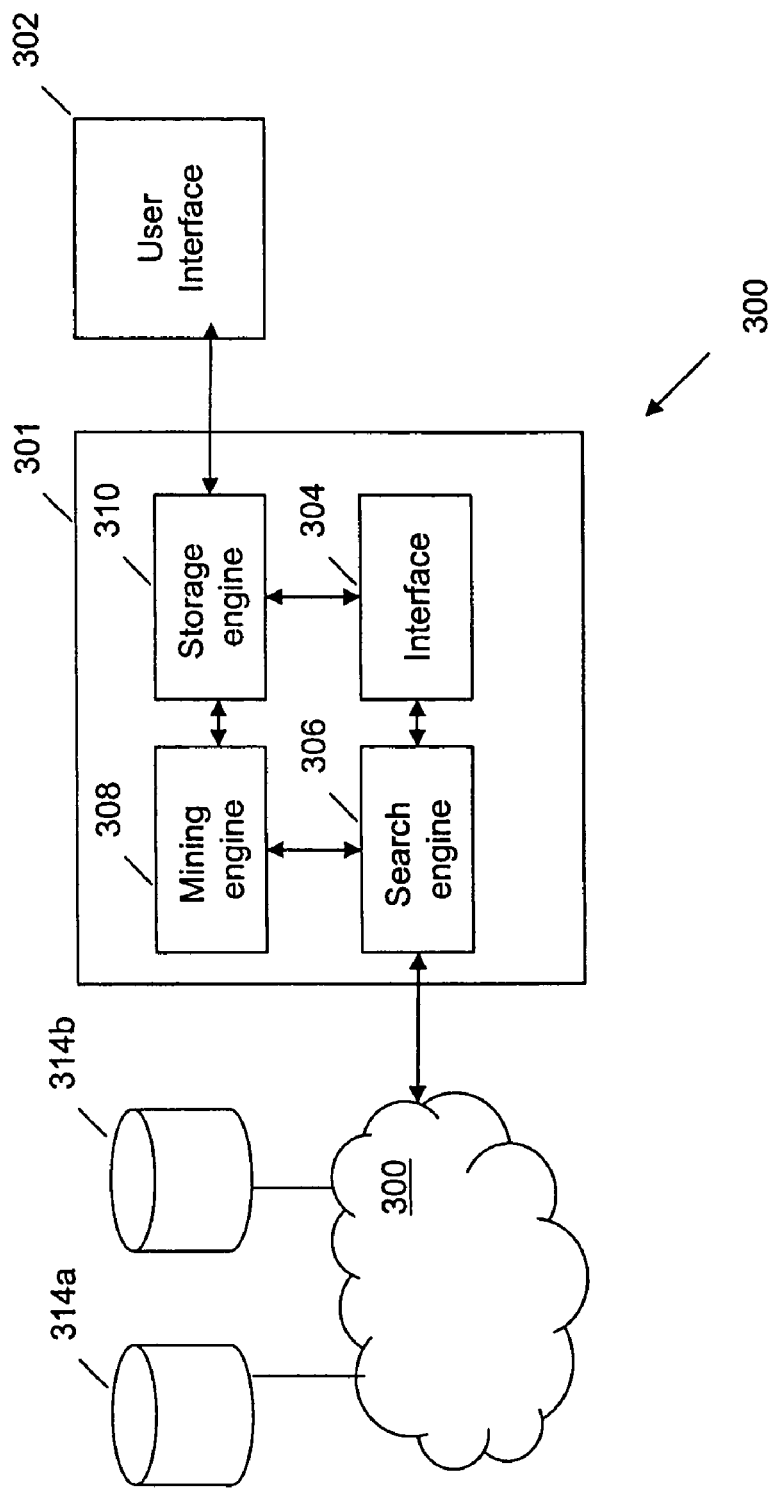
FIG. 3 is a block diagram of a computer system on which the process of FIG. 2 may be executed.

FIG. 3 shows a computer system 300 for obtaining translations of business objects automatically using process 199. In this implementation, computer system 300 includes a computer 301, which may include a processor that is capable of executing instructions to perform process 199. The instructions may be stored, e.g., on a machine-readable medium, such as a compact disk or other memory. Computer 301 include a user interface 302 (e.g., keyboard, monitor, etc.), a data interface 304 for receiving a business object, a search engine 306 for searching business objects, a mining engine 308 for obtaining translations from business objects obtained by the search engine, and a storage engine 310. The various engines may be implemented by the processor and the instructions noted above.

FIG. 3 also shows a computer network 312, which may be a distributed network containing various computers and/or one or more databases 314*a*, 314*b*.

Interface 304 receives a business object and determines whether the business object, or a portion thereof, requires translation into another language. Interface 304 may also receive a target language (into which the business object, or portion thereof, is to be translated). Data identifying the target language may be received either directly from a user at user interface 302 or from a database or other storage area. This data may be used to locate business objects during searching, e.g., business objects having language identifiers that correspond to the target language.

In accordance with process 199, search engine 306 searches computer 301 and/or other locations, such as distributed databases 314*a*, 314*b*, for business objects having object types that match the object type of the business object to be translated. Mining engine 308 processes any business object (s) identified by search engine 306. In particular, mining engine 308 extracts translations of the business objects'types, attribute names, and corresponding attribute values, as described above with respect to process 199.

Resulting translations may be presented to a user via user-interface 302, e.g., for approval. In response, the user may confirm the translation or reject the translation. Storage engine 310 stores, in memory, confirmed translations or, if confirmation is not required, any translations obtained by mining engine 308. As described above, if translations into particular languages are not available and/or cannot be obtained by mining engine 308, user interface 302 may be controlled to request that the user provide such translations. As noted above, a user may ignore this request or respond. If a user responds by providing the requested translations, storage engine 310 stores any user-provided translations in memory along with any translations obtained by mining engine 308.

Following translation, the translated business object may be made available for future use through interface 304. For example, the business object may be stored in database 314*a* or 314*b*, and may be used in the translation of other business objects.

All or part of process 199, and its various modifications described herein, (hereinafter, "the processes") can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Actions associated with the processes can be rearranged and/or one or more such actions can be omitted to achieve the same, or similar, results to those described herein.

Elements of different embodiments described herein may be combined to form other embodiments not specifically set forth above. Other embodiments not specifically described herein are also within the scope of the following claims.

What is claimed is:

1. A method comprising:
   automatically translating a first data object from an initial language into a target language, the first data object having a first object type and a first content, the first object type and the first content being in the initial language, the translating including:
   searching, with a processor-based search engine, one or more databases to locate a second data object, the second data object having:
   a second object type that matches the first object type, a second content that matches the first content, and translations of the second object type and second content in the target language; and
   obtaining, from the second data object, the translations of the second object type and second content in the target language; and
   storing in memory, in the first data object, the obtained translations of the second object type and second content in the target language;
   wherein both the first data object and the second data object being a self-contained entity that includes both data and procedure to manipulate the data.

2. The method of claim 1, wherein the first content comprises at least one attribute and at least one attribute value that corresponds to the attribute, the at least one attribute containing data that relates to a subject of the first data object and the at least one attribute value containing data that specifies the attribute.

3. The method of claim 1, further comprising:
   obtaining, from the second data object, translations of the second object type and second content in a second target language; and
   storing, in the first data object, the obtained translations of the second object type and second content in the second target language.

4. The method of claim 1, wherein the second data object comprises a language identifier that corresponds to the target language; and
   wherein searching comprises using the language identifier to locate the second data object.

5. The method of claim 1, further comprising:
   receiving data corresponding to the target language;
   wherein searching comprises using the data corresponding to the target language to locate the second data object.

6. The method of claim 1, wherein if at least one of the translations of the second object type and second content in the target language cannot be obtained from the second data object, the method further comprises:
   requesting, from an external source, at least one of the translations of the second object type and the second content in the target language.

7. The method of claim 1, further comprising:
   requesting confirmation of at least one of the translations of the second object type and the second content in the target language prior to storing, in the first data object, the translations of the second object type and the second content in the target language.

8. The method of claim 1, further comprising:
   before searching, attempting to obtain, from the first data object, translations of the first object type and first content in the target language.

9. The method of claim 8, wherein, if the translations of the first object type and first content in the target language are obtained from the first data object, the method comprises skipping searching the database to locate a second data object having the second object type, and skipping attempting to obtain, from the second data object, the translations of second object type and the second content in the target language.

10. A non-transitory machine-readable storage medium comprising instructions that, when executed by a machine, cause at least one processor within the machine to perform operations comprising:
    automatically translating a first data object from an initial language into a target language, the first data object having a first object type and a first content, the first object type and the first content being in the initial language, the translating including:
    searching, with a processor-based search engine, one or more databases to locate a second data object, the second data object having:
    a second object type that matches the first object type, a second content that matches the first content, and translations of the second object type and second content in the target language;
    obtaining, from the second data object, the translations of the second object type and second content in the target language; and
    storing in memory, in the first data object, the obtained translations of the second object type and second content in the target language;
    wherein both the first data object and the second data object being a self-contained entity that includes both data and procedure to manipulate the data.

11. The non-transitory machine-readable storage medium of claim 10, wherein the first content comprises at least one attribute and at least one attribute value that corresponds to the attribute, the at least one attribute containing data that relates to a subject of the first data object and the at least one attribute value containing data that specifies the attribute.

12. The non-transitory machine-readable storage medium of claim 10, further comprising instructions that, when executed, cause the at least one processor to perform operations comprising:
    obtaining, from the second data object, translations of the second object type and second content into a second target language; and
    storing, in the first data object, the translations of the second object type and second content in the second target language.

13. The non-transitory machine-readable storage medium of claim 10, wherein the second data object comprises a language identifier that corresponds to the target language; and
    wherein searching comprises using the language identifier to locate the second data object.

14. The non-transitory machine-readable storage medium of claim 10, further comprising instructions that, when executed, cause the at least one processor to perform operations comprising:
receiving data corresponding to the target language;
wherein searching comprises using the data corresponding to the target language to locate the second data object.

15. The non-transitory machine-readable storage medium of claim 10, wherein if at least one of the translations of the second object type and second content in the target language cannot be obtained from the second data object, the instructions, when executed, cause the at least one processor to perform operations comprising:
requesting, from an external source, at least one of the translations of the second object type and the second content in the target language.

16. The non-transitory machine-readable storage medium of claim 10, further comprising instructions that, when executed, cause the at least one processor to perform operations comprising:
requesting confirmation of at least one of the translations of the second object type and the second content in the target language prior to storing, in the first data object, the translations of the second object type and the second content.

17. The non-transitory machine-readable storage medium of claim 10, further comprising instructions that, when executed, cause the at least one processor to perform operations comprising:
before searching, attempting to obtain, from the first data object, translations of the first object type and first content in the target language.

18. The non-transitory machine-readable storage medium of claim 17, wherein, if the translation of the first object type and first content in the target language is obtained from the first data object, the instructions, when executed, cause the at least one processor to skip searching the database to locate a second data object having the second object type, and to skip attempting to obtain, from the second data object, the translations of the second object type and the second content in the target language.

19. A system comprising:
a computer to automatically translate a first data object from an initial language into a target language, the first data object having a first object type and a first content, the first object type and the first content being in the initial language;
a search engine configured to search a database to locate a second data object, the second data object having:
a second object type that matches the first object type, a second content that matches the first content, and translations of the second object type and second content in the target language;
a mining engine configured to obtain, from the second data object, the translations of the second object type and the second content into the target language; and
a storage engine configured to store, in the first data object, the translations of the second object type and second content in the target language;
wherein both the first data object and the second data object being a self-contained entity that includes both data and procedure to manipulate the data.

20. The system of claim 19, wherein the first content comprises at least one attribute and at least one attribute value that corresponds to the attribute, the at least one attribute containing data that relates to a subject of the first data object and the at least one attribute value containing data that specifies the attribute.

\* \* \* \* \*